United States Patent
Söhn et al.

(10) Patent No.: US 11,919,794 B2
(45) Date of Patent: Mar. 5, 2024

(54) QUARTZ GLASS TUBE AND METHOD OF MANUFACTURING THE SAME

(71) Applicant: Heraeus Quarzglas GmbH & Co. KG, Hanau (DE)

(72) Inventors: Matthias Söhn, Hanau (DE); Boris Gromann, Hanau (DE); Eduard Visnow, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 38 days.

(21) Appl. No.: 17/706,748

(22) Filed: Mar. 29, 2022

(65) Prior Publication Data

US 2022/0306513 A1  Sep. 29, 2022

(30) Foreign Application Priority Data

Mar. 29, 2021  (EP) .................................... 21165574

(51) Int. Cl.
*C03B 9/36* (2006.01)
*C03B 9/38* (2006.01)
(Continued)

(52) U.S. Cl.
CPC ............ *C03B 11/16* (2013.01); *C03B 11/127* (2013.01); *C03B 23/07* (2013.01); *C03B 23/047* (2013.01); *C03B 2215/40* (2013.01)

(58) Field of Classification Search
CPC ........ C03B 37/01208; C03B 37/01245; C03B 2205/40; C03B 23/07; C03B 23/045; C03B 23/08; C03B 23/053; C03B 23/047
See application file for complete search history.

(56) References Cited

U.S. PATENT DOCUMENTS

| | | | | |
|---|---|---|---|---|
| 4,298,364 A | * | 11/1981 | Blaszyk ............ | C03B 37/01861 65/110 |
| 5,171,343 A | * | 12/1992 | Leber .................... | C03B 23/047 65/109 |

(Continued)

FOREIGN PATENT DOCUMENTS

| CN | 108516668 A | * | 9/2018 | ........... C03B 23/047 |
|---|---|---|---|---|
| DE | 10228599 B4 | * | 9/2007 | ........... C03B 23/047 |

(Continued)

*Primary Examiner* — Galen H Hauth
*Assistant Examiner* — Steven S Lee
(74) *Attorney, Agent, or Firm* — Dicke, Billig & Czaja, PLLC

(57) ABSTRACT

In a method of manufacturing a tube of quartz glass by molding a hollow cylinder having a wall thickness of at least 20 mm, the cylinder is continuously fed under rotation about a rotational axis into a heating zone at a relative feed rate $V_C$, softened and radially expanded under the effect of a gas pressure. A tube strand is continuously formed and is withdrawn at a withdrawal rate $V_T$. In order to mold thick-walled initial hollow cylinders of quartz glass into tubes with larger diameter, the gas pressure is used as an actuating variable of a diameter regulation for the tube outer diameter or for a geometrical correlated parameter thereof, and in a pressure build-up phase the gas pressure is gradually increased from a lower initial value to a higher final value, and that the following applies to the ratio of $V_C$ and $V_T$: $V_T = V_C \pm 0.2 \cdot V_C$.

19 Claims, 4 Drawing Sheets

(51) Int. Cl.
*C03B 11/12* (2006.01)
*C03B 11/16* (2006.01)
*C03B 17/04* (2006.01)
*C03B 23/047* (2006.01)
*C03B 23/07* (2006.01)

(56) References Cited

U.S. PATENT DOCUMENTS

| | | | | |
|---|---|---|---|---|
| 5,785,729 | A * | 7/1998 | Yokokawa | C03B 23/047 65/102 |
| 6,098,428 | A * | 8/2000 | Bogdahn | C03B 23/047 65/393 |
| 9,725,351 | B2 * | 8/2017 | Donelon | C03B 23/053 |
| 2008/0041112 | A1 * | 2/2008 | Cibis | C03B 23/047 65/439 |
| 2009/0019893 | A1 * | 1/2009 | Bogdahn | C03B 37/01257 65/108 |
| 2012/0011889 | A1 * | 1/2012 | Bogdahn | C03B 17/04 65/29.14 |
| 2014/0245796 | A1 * | 9/2014 | Bernard | C03B 37/01242 65/384 |
| 2016/0168005 | A1 * | 6/2016 | Gromann | C03B 23/045 65/109 |
| 2016/0318789 | A1 * | 11/2016 | Gromann | C03B 23/045 |
| 2017/0001901 | A1 * | 1/2017 | Ganz | C03B 23/047 |
| 2017/0327403 | A1 * | 11/2017 | Gromann | C03B 23/07 |

FOREIGN PATENT DOCUMENTS

| | | | | |
|---|---|---|---|---|
| DE | 102006055397 | B3 * | 5/2008 | C03B 23/047 |
| JP | 2005145740 | A * | 6/2005 | C03B 23/07 |
| JP | 2006335577 | A * | 12/2006 | C03B 23/047 |
| JP | 2007-001811 | | 1/2007 | |
| JP | 2007001811 | A * | 1/2007 | C03B 23/07 |
| JP | 2007022874 | A * | 2/2007 | C03B 23/047 |
| JP | 2007246327 | A * | 9/2007 | C03B 23/047 |
| JP | 2007320803 | A * | 12/2007 | C03B 23/047 |
| JP | 2010-111557 | | 5/2010 | |
| JP | 5133210 | B2 * | 1/2013 | |
| WO | WO-0055100 | A1 * | 9/2000 | C03B 19/1453 |
| WO | WO-2014202525 | A1 * | 12/2014 | B29B 13/024 |

* cited by examiner

QUARTZ GLASS TUBE AND METHOD OF MANUFACTURING THE SAME

CROSS-REFERENCE TO RELATED APPLICATION

This Utility patent application claims priority to European Application No. 21 165 574.1 filed on Mar. 29, 2021, which is incorporated herein by reference.

TECHNICAL FIELD

The present embodiment relates to a method of manufacturing a quartz glass tube.

BACKGROUND

By using such methods and devices, hollow cylinders of glass; in particular quartz glass, are molded into tubes in one or a plurality of hot molding steps, wherein the radial tube dimensions are changed compared to the radial dimensions of the hollow cylinder. An initial hollow cylinder rotating about the longitudinal axis thereof is softened zone by zone and, under the influence of a force directed radially outward, is either stretched against a molding tool arranged at a predetermined radial distance from the longitudinal axis of the tube, or it is molded without a tool. The radially outward force is based on centrifugal force and/or internal overpressure in the hollow cylinder inner bore (also referred to as "gas pressure").

The terms "inner bore" or "bore" in connection with a tube or hollow cylinder do not imply that the inner bore or bore has been produced by a drilling operation.

Concerning the heating of the initial hollow cylinder, a distinction can be made between a flame-based heating zone and an electrically heated furnace. Quartz glass is a good thermal insulator, so flame-based heating zones, in which surface heating is based primarily on recombination reactions with low penetration of the heating effect, are limited to molding hollow starting cylinders with small wall thicknesses, for example, wall thicknesses of less than 10 mm. In contrast, electrically heated furnaces allow a higher and also over a greater distance homogeneous heat input, since the infrared radiation can penetrate deep into the glass. In general, the aim is to achieve high dimensional accuracy and surface quality of the withdrawn tube strand. Tool-free forming speaks for a high surface quality.

Maintaining dimensional accuracy, however, is usually easier to achieve by using a molding tool. In any case, the continuous acquisition and regulation of a radial dimension of the tube strand, such as the outer diameter, the inner diameter or the wall thickness, is indispensable. The gas pressure, the relative feed rate between the hollow cylinder and the heating zone, and the temperature in the heating zone are commonly used as actuating variables for such a regulation.

A method for producing quartz glass tubes of the above-mentioned type is known from JP 2010-111557 A. Here, a thick-walled quartz glass hollow cylinder having an outer diameter of 200 mm with a horizontally oriented longitudinal axis is fed continuously and under rotation at a feed rate of 4 cm/min into a heating furnace and softened therein zone by zone to a temperature of around 2100° C. Inside the heating furnace, water-cooled graphite plates are arranged at an adjustable radial distance from the longitudinal axis of the tube and serve as a molding tool. As a result of overpressure inside the hollow cylinder, the softened quartz glass is blown against the graphite plates, molding it into a tube strand that is withdrawn from the heating furnace at a withdrawal rate of 12 cm/min. The tube strand thereby detaches from the graphite plates, which may still result in diameter changes depending on the process conditions. In order to achieve independent regulation of the tube strand outer diameter to a nominal value of 340 mm, two cameras are provided which are arranged laterally on the left and right of the tube strand and which generate an image of the left circumferential line of the tube strand and an image of the right circumferential line of the tube strand respectively. From the images, the outer diameter of the tube strand is continuously determined as a regulated variable for the regulation doing so by using image processing. The actuating variable of the regulation is the radial distance of the water-cooled graphite plates from the longitudinal axis of the tube, which can be adjusted by using a motorized molding-jaw tracking system.

Publications US 2017/327403 A1 and JP 2007-001811 A describe further methods for manufacturing large diameter quartz glass tubes using a molding tool, such as graphite plates. Because of the shortcomings of the art, and for other reasons there is a need for the present invention.

SUMMARY

One embodiment relates to a method of manufacturing a quartz glass tube by forming a hollow cylinder having a hollow cylinder bore, an outer diameter $C_a$, an inner diameter $C_i$ and a wall thickness of at least 20 mm by continuously feeding it under rotation around a rotational axis into a heating zone at a relative feed rate $V_C$, softened therein in areas, and the softened area being radially expanded under the effect of a gas pressure applied in the hollow cylinder bore, and a tube strand having a tube outer diameter $T_a$, a tube inner diameter $T_i$ and a tube wall thickness being continuously molded from the softened area and withdrawn at a withdrawal speed $V_T$.

In addition, the embodiment relates to a quartz glass tube having a tube outer diameter $T_a$, a tube inner diameter $T_i$, a tube wall thickness, an outer lateral surface, and an inner lateral surface.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

The embodiments are explained in more detail below with reference to an exemplary embodiment and a drawing. The following are illustrated in detail.

DETAILED DESCRIPTION

Figure 1:
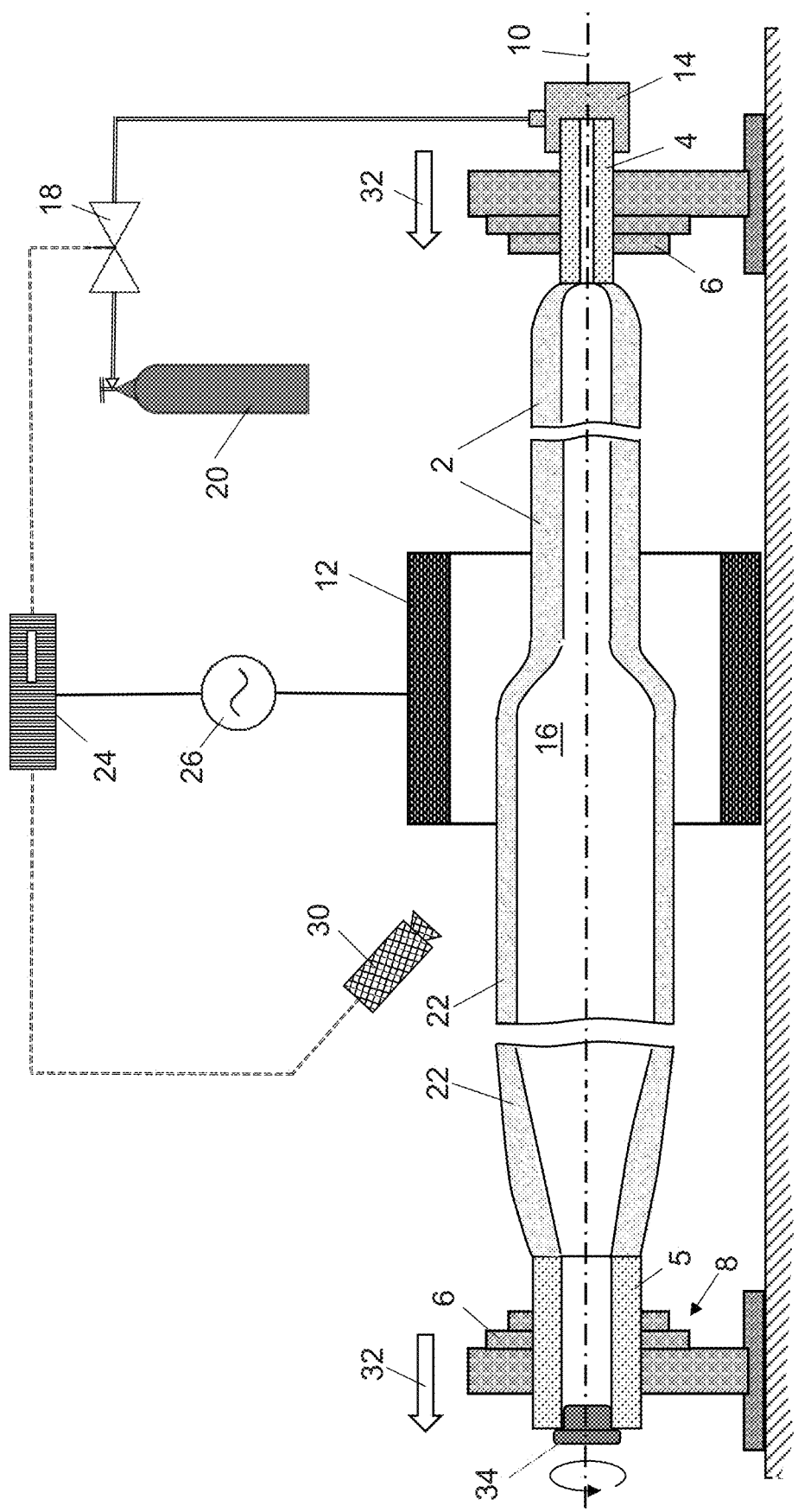
FIG. 1 illustrates a device for molding a hollow cylinder of quartz glass into a quartz glass tube in side view and in schematic view.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Technical Embodiment

As a result of the rotation of the hollow cylinder around the longitudinal axis thereof, the spaced-apart graphite plates define a circular "quasi-opening" through which the softened quartz glass is forced during the molding process. The graphite plates lead to defects, particularly spiral stripes on the outside of the withdrawn quartz tube.

As a result of the internal overpressure gas pressure, a circumferential bead of soft quartz glass can build up in front of the graphite plates—seen in the feed direction of the hollow cylinder into the furnace. Its volume is subject to a renewal mechanism in which new glass is constantly accumulated and withdrawn at the same rate via the tube strand, since the withdrawal rate of the tube strand is significantly higher than the feed rate of the hollow cylinder. This speed ratio causes the hollow cylinder to "elongate" and is inevitably accompanied by a reduction in the cross-sectional glass surface area of the molded tube relative to that of the initial hollow cylinder.

All attempts by the known method to obtain quartz glass tubes with the same or a greater glass cross-sectional surface area have failed so far. This can be attributed to the fact that a reversal of the aforementioned speed ratio is required for this, i.e. a withdrawal rate of the tube strand that is lower than the feed rate of the hollow cylinder, which is also commonly referred to as "compressing". During compression, the above-mentioned renewal mechanism of the bead volume no longer works, since more softened glass volume permanently accumulates in front of the "quasi-opening" than is removed. When molding a hollow cylinder, this "pushing" of the softened glass volume against the molding tool either results in the molding tool having to be opened briefly, or the bead is pushed inward at irregular intervals, or it sticks to the molding tool. In the first case, there are fluctuations in the inner and outer diameters, in the second case there are fluctuations in the inner diameter, and in the third case the molding process is aborted. Whatever the case, the result is an unstable process.

Due to their short heating zone, flame-based heating zones allow compression of the initial hollow cylinder to a small extent, but—as already mentioned above—only with small wall thicknesses of the initial hollow cylinder to be molded of less than 10 mm.

There is thus a need for large and at the same time thick-walled quartz glass tubes with good surface quality.

It is thus the object of one embodiment to provide a corresponding tube made of quartz glass.

It is also the object of one embodiment to provide a method for molding thick-walled initial hollow cylinders of quartz glass having wall thicknesses greater than 20 mm into tubes of larger diameter but of approximately equal or greater glass cross-sectional surface.

General Description of One Embodiment

With regard to the method, this object is solved according to one embodiment on the basis of the method mentioned at the beginning in that the gas pressure is used as an actuating variable of a diameter regulation and/or a diameter control for the tube outer diameter or for a geometrical parameter correlated with the tube outer diameter, and in that in a pressure build-up phase the gas pressure is gradually increased from a lower initial value to a higher final value, and in that the following applies to the ratio of $V_C$ and $V_T$: $V_T = V_C \pm 0.2 \cdot V_C$.

The initial hollow cylinder—or for short, hollow cylinder—is made of quartz glass. This can be melted from naturally occurring raw materials or produced from synthetically generated $SiO_2$. The quartz glass is undoped or it contains one or a plurality of dopants. The hollow cylinder is thick-walled; that is, the wall thickness thereof is, for example, more than 20 mm, more than 40 mm, more than 60 mm or more than 80 mm.

In the molding process, the initial hollow cylinder is oriented substantially in such a manner that its hollow cylinder longitudinal axis is in one embodiment horizontal. The result of the molding process is a tube strand from which a quartz glass tube or a plurality of quartz glass tubes of the desired length are cut. The terms "tube" and "tube strand" are used synonymously here. The quartz tube has a larger outer diameter and a larger inner diameter than the initial hollow cylinder. Unless an explicit distinction has to be made between inner diameter and outer diameter, the collective term "diameter" or "radial geometry" is also used below for both dimensions. The "radial geometry" of the initial hollow cylinder is also called the "starting geometry" and the "radial geometry" of the tube strand is called the "target geometry".

The goal of the molding process is to produce a quartz glass tube having a glass cross-sectional surface approximately equal to or even greater than the glass cross-sectional surface of the initial hollow cylinder. The glass cross-sectional surface is the surface occupied by glass in a section perpendicular to the longitudinal axis of the tube.

The target geometry, in one embodiment the tube strand outer diameter, is the target variable of a regulation or control. The regulation is computer-controlled on the basis of measured values for the target variable; regulation can also be carried out manually, at least partially, by making settings on the basis of read parameter values. There are also combinations of regulation and control for example, regulation with feedforward control. Unless expressly excluded, the terms "regulation" or "regulate" are used in the following as a collective term for "control" or "controlling" and also for combinations of these measures.

The molding process according to one embodiment differs from the previous method in at least three aspects.

(i) The use of a molding tool is dispensed with for the reason explained above. This is because "pushing" the softened glass volume through the "quasi-opening" of the molding tool would lead to an unstable process in which more and more softened glass volume would build up in front of the molding tool and cause waviness in the tube strand. In this case, a variation in the cross-sectional surface is observed that cannot be determined by calculating from the upsetting rate (ratio of feed rate to withdrawal rate) and the cross-section of the initial hollow cylinder.

Although there are advantages to eliminating the molding tool, the tube surface is smooth and fire-polished. Chemical contamination of the glass by the molding tool material can be ruled out.

However, in order to be able to reliably and precisely manufacture the desired target geometry by free molding, a different regulation for the tube strand diameter is required. In the method according to one embodiment, the gas pressure is therefore used directly or indirectly as an actuating variable of a diameter regulation and/or a diameter control for the tube strand outer diameter or for a geometric parameter correlated with the tube outer diameter. Indirect use in this sense occurs, for example, when the actuating variable is not the gas pressure, but a parameter correlated with the gas pressure, such as the flow rate of a compressed gas. The inner and/or outer diameter of the withdrawn tube strand is measured or read.

Geometric parameters correlated with the tube outer diameter are, for example, the inner diameter and the wall thickness of the tube. The tube outer diameter can be detected optically. The inner diameter is determined by the cross-sectional surface and the upsetting rate (ratio of feed rate to withdrawal rate). The prerequisite for this is a stable process in which there are no changes in the cross-sectional surface.

The molding of the hollow cylinder is based on the gas pressure or on the centrifugal force during rotation (spinning) or on both effects. The share of the gas pressure in the tangential stress σT in the tube wall is described by the so-called boiler formula:

$$\sigma T = \text{pressure} * \text{radius} / \text{wall thickness} \quad (1),$$

wherein:
pressure=gas pressure
radius=tube radius in the deformation area
wall thickness=wall thickness in the deformation area In the "deformation area", wall thickness, diameter and temperature (viscosity) change continuously. For example, the diameter of the softened glass strand increases continuously from the hollow cylinder to the tube as a function of the deformation resistance of the glass, which is determined in one embodiment by the wall thickness and viscosity. In longitudinal section, the deformation area illustrates an overall funnel shape having a more or less pronounced S-shaped transition between the hollow cylinder and the tube, which is also referred to as the "shoulder" in the following. In practice, the deformation area typically has a length of several 100 millimeters, for example 200 to 800 mm, often approximately 500 mm.

The tangential tension, in turn, causes the adjustment of the tube radius (r) in the deformation area according to the differential equation:

$$d\text{Radius}/dt = \text{tension} * \text{radius} / \text{viscosity} \quad (2).$$

wherein:
dRadius/dt=elongation rate
tension=tangential tension
radius=tube radius in the deformation area
viscosity=value of the local viscosity averaged over the wall thickness (ii) For each given set of parameters (radial geometry of initial hollow cylinder and tube strand as well as process parameters, such as feed and withdrawal rates, gas pressure and temperature distribution in the deformation area), there exists only one stable, stationary shoulder shape, which is the solution of the differential equation (2). Only the value for the gas pressure on which this calculation is based ideally leads to the target geometry, starting from the starting geometry and as a function of the process parameters.

This value for the gas pressure can be used as a nominal initial value for the regulation or control of the radial geometry of the tube strand (provided that the gas pressure is used as an actuating variable for the regulation/control at least in the alternative). However, it has been illustrated—and this also follows from equation (2) above—that each pressure change has an effect not only at one location, but at all locations in the deformation area, and to varying degrees depending on the current local conditions. For this reason any change in pressure leads to fluctuations in the target geometry, which, however, only become visible much later, i.e. after a very long dead time, and which can no longer be regulated. The regulation can easily enter an unstable, oscillating state that results in a tube strand with a wave structure.

The long dead time can hardly be shortened at all, due to the manufacturing process. It is therefore proposed to dispense with abrupt pressure changes, such as might be made at the start of a molding process for the purpose of adjusting the gas pressure to the nominal initial value thereof. Instead, it is proposed to gradually increase the gas pressure from a lower initial value to a higher final value during a pressure adjustment phase. Gradual in this context means that the gas pressure is increased steadily—in the smallest possible steps or, ideally, continuously. The initial value is a pressure value that is zero or that is well below the final gas pressure value, and the final value is a pressure value that is within the range of the actuating value for the regulation/control of the target geometry. During the pressure build-up phase, the molding process is already taking place, i.e. quartz glass material of the initial hollow cylinder is being continuously molded into quartz glass material of the tube strand, although the latter has not yet reached the specified radial geometry thereof.

For each pair of starting and target geometries, there exists a maximum possible ramp to avoid entering into an unstable, oscillatory state. This can be calculated with the differential equation (2). This maximum possible ramp is an ideal value. Higher pressure-boosting ramps can lead to a deterioration in terms of consistency of the outer diameter withdrawn and/or to a higher material loss. Then again, lower pressure boosting ramps than the ideal value are harmless with respect to the constancy of the outer diameter. The opposite is the case; no lower limit in this respect could be identified. However, a lower pressure-boosting ramp results in a long period of time before the specified final gas pressure value and thus the nominal diameter value is set, which is associated with a loss of time and material, since the specified radial geometry of the tube has not been set by then and the tube material produced by then represents only a loss of material. There is therefore an economic motive for setting the pressure-boosting ramp as large as possible. Although not time loss but material loss can be reduced by using an initial hollow cylinder with the front end made of lower quality dummy material.

(iii) A goal of the molding process is a tube with a larger diameter than the initial hollow cylinder but of approximately the same or a larger glass cross-sectional surface. For this purpose, the ratio of the withdrawal rate $V_T$ of the tube strand and the feed rate $V_C$ of the initial hollow cylinder must be set in such that: $V_T = V_C \pm 0.2 \cdot V_C$.

In this molding process, the withdrawal rate $V_T$ is therefore in the range of the feed rate $V_C$ or even lower than it. In contrast, when elongating a starting cylinder to form a tube strand, the feed rate into the heating zone is much lower than the withdrawal rate of the tube strand from the heating zone. This results in a certain inherent stability of the drawing process during elongation, which facilitates the adjustment and regulation of the radial geometry of the tube strand. However, during elongation, the glass cross-sectional surfaces of the initial cylinder and tube strand usually differ significantly. The inherent stability given to the elongation process cannot occur in the present molding process. The method according to one embodiment compensates for this disadvantage by using measures (i) and (ii) explained above.

In this manner, tubes having wall thicknesses greater than 20 mm and having a glass cross-sectional surface equal to or greater than that of the initial hollow cylinder can be manufactured for the first time from thick-walled quartz glass hollow cylinders by free molding.

A conventional regulation to the target geometry of the tube strand would, starting from the low gas pressure initial value, cause the gas pressure final value to be set as quickly as possible, which can, however, lead to process instabilities and an oscillating condition for the reason explained previously. The gradual increase of the gas pressure in the pressure build-up phase is therefore in one embodiment carried out independently of diameter regulation or independently of diameter control.

In the simplest case, the gas pressure is increased manually in small steps until the nominal gas pressure is reached. In one embodiment, the gas pressure is increased in a controlled manner, either linearly or based on a non-linear function, until the nominal gas pressure is reached. Independently of a regular diameter regulation, however, the gradual increase of the gas pressure in the pressure build-up phase is in one embodiment also effected by a regulation.

The regular diameter regulation or control is assigned a nominal diameter value for the tube outer diameter and/or for the tube inner diameter, wherein a nominal gas pressure is assigned to the nominal diameter value. It is advantageous if the lower initial value is in the range of 0 to 50% of the nominal gas pressure, in one embodiment in the range of 10 to 30% of the nominal gas pressure, and the higher final value is in the range of 70 to 110% of the nominal gas pressure, in one embodiment in the range of 90 to 100% of the nominal gas pressure.

The pressure build-up phase precedes the actual molding process. At the beginning of the pressure build-up phase, the hollow cylinder has reached the softening temperature and the process parameters, such as the temperature of the heating zone, the feed rate and the withdrawal rate, are set as they are to be expected in the actual molding process. During the pressure build-up phase, the gas pressure in the hollow cylinder inner bore (and thus also in the tube strand inner bore) is slowly increased to the final value, starting with the lower initial pressure value. Only when the nominal gas pressure is reached is a tube strand with the target geometry created. The tube strand material formed up to that point is loss. The loss of material can be reduced if the initial piece of the initial hollow cylinder is made of low grade quartz glass. Regardless of this, the pressure build-up phase should be as short as possible and only as long as necessary, on the one hand to keep material loss low and, on the other hand, to achieve a stable state of the molding process by using a flat pressure-boosting ramp. In order to keep the pressure build-up phase as short as possible despite a flat pressure-boosting ramp, a certain initial value of the gas pressure above zero to approximately 50% of the nominal gas pressure, in one embodiment up to a maximum of 30% of the nominal gas pressure, is advantageous.

The nominal gas pressure lies, for example, in the range from 2 to 20 mbar, in one embodiment in the range from 3 to 15 mbar, and in one embodiment in the range from 4 to 10 mbar. A particularly high gas pressure of more than 20 mbar can affect process stability.

However, it is not absolutely necessary that the pressure increase in the pressure build-up phase leads exactly to the nominal gas pressure. This is because the regular diameter regulation or control can take over the pressure adjustment when at least 70%, in one embodiment at least 90% of the nominal gas pressure has been reached, or even when the pressure is already slightly higher than the nominal gas pressure.

It is necessary to weigh up between the shortest possible pressure build-up phase and thus the lowest possible material loss on the one hand and a pressure boosting ramp that is as flat as possible and thus on the other hand an exact adjustment of the target geometry with few diameter fluctuations. It has proved to be a particularly suitable compromise if the pressure build-up phase has a duration of between 1 and 120 minutes, in one embodiment a duration of between 5 and 100 minutes, in one embodiment a duration of between 10 and 80 minutes, and in one embodiment a duration of between 15 and 60 minutes.

These considerations also result in the temporal course of the pressure increase in the pressure build-up phase. The pressure increase can, for example, take place with a constant gradient (linear) or it can have a non-linear course with a decreasing or increasing gradient at the end. It has proven favorable if the gas pressure is increased at least temporarily during the pressure build-up phase with a time ramp $\Delta p$ for which there applies:

0.01 mbar/min<$\Delta p$<0.8 mbar/min in one embodiment: $\Delta p$<0.5 mbar/min and in one embodiment $\Delta p$<0.2 mbar/min.

Regardless of the temporal course of the pressure increase in the pressure build-up phase, the pressure increase ramp can also be assigned an average value over the entire pressure build-up phase. Here the gas pressure is in one embodiment increased during the entire pressure build-up phase with an average temporal ramp $\Delta p_m$, for which there applies:

0.01 mbar/min<$\Delta p_m$<0.5 mbar/min in one embodiment: $\Delta p_m$<0.1 mbar/min and in one embodiment $\Delta p_m$<0.06 mbar/min.

The molding process is particularly suitable for the industrial production of large-volume and thick-walled quartz glass tubes. With regard to this, the hollow cylinder (cylinder; C) and the tube strand (tube; T) in one embodiment have the following radial geometry:

$$150 \text{ mm} < C_a < 300 \text{ mm},$$
$$30 \text{ mm} < C_i < 180 \text{ mm},$$
$$40 \text{ mm} < (C_a-C_i)/2) < 100 \text{ mm}$$
$$300 \text{ mm} < T_a < 500 \text{ mm},$$
$$250 \text{ mm} < T_i < 450 \text{ mm},$$
$$20 \text{ mm} < (T_a-T_i)/2) < 60 \text{ mm}.$$

The molding process results in a quartz glass tube having a larger outer diameter and larger inner diameter than the initial hollow cylinder. For the hollow cylinder and for the tube strand, the following mutual relationships in one embodiment result:

$$4 \cdot C_i < T_i < 8 \cdot C_i,$$
$$C_a + 100 \text{ mm} < T_a < C_a + 300 \text{ mm}.$$

In one embodiment, the tube outer diameter $T_a$ lies in the range of 1.5 to 2.2 times the hollow cylinder outer diameter $C_a$.

The molding process is also particularly suitable for producing large-diameter quartz glass tubes with approximately the same or greater glass cross-sectional surface as the initial hollow cylinder. Advantageously, there is the following relationship between the glass cross-sectional surface $A_C$ of the initial hollow cylinder and the glass cross-sectional surface $A_T$ of the tube strand:

$A_T = A_C \pm 0.15 \cdot A_C$ in one embodiment:
$0.90 \cdot A_C \leq A_T \leq 1.15 \cdot A_C$, in one embodiment:
$A_C \leq A_T \leq 1.10 \cdot A_C$.

Here, the glass cross-sectional surfaces $A_C$ and $A_T$ in one embodiment lie in the range of 250 to 1000 cm$^2$.

When an initial cylinder is elongated to form a tube strand, the feed rate thereof into the heating zone is considerably lower than the withdrawal rate of the tube strand from the heating zone. This results in a certain inherent stability of the drawing process during elongation, which facilitates the adjustment and regulation of the radial geometry of the tube strand. However, the glass cross-sectional surfaces of the initial cylinder and tube strand differ significantly. In contrast, in the molding process described herein, the withdrawal rate of the tube strand lies within the range of the feed rate or is even lower than it. As a result, the inherent stability given in the elongation process cannot occur. The method according to one embodiment avoids this disadvantage, wherein the following applies in one embodiment to the ratio of $V_C$ and $V_T$:

$0.8 \cdot V_C \leq V_T \leq 1.05 \cdot V_C$, in one embodiment:
$0.9 \cdot V_C \leq V_T \leq 0.99 \cdot V_C$.

The wall thickness of the tube strand is determined by the ratio of the velocities $V_C$ and $V_T$. If this velocity ratio is less than 1, the tube strand will not elongate, but an upset will occur.

It has been illustrated that process instabilities are easier to avoid with a comparatively low throughput of glass mass. In view of this, it has proved useful if $V_C$ is adjusted to give a throughput of quartz glass mass of at least 30 kg/h but less than 60 kg/h and in one embodiment less than 45 kg/h.

With regard to the tube made of quartz glass, the above-mentioned object is solved according to one embodiment in that it has a fire-polished outer lateral surface and in that for the tube outer diameter $T_a$, the tube inner diameter $T_i$ and the tube wall thickness apply:

$$300 \text{ mm} < T_a < 550 \text{ mm},$$
$$250 \text{ mm} < T_i < 450 \text{ mm},$$
$$20 \text{ mm} < (T_a-T_i)/2) < 60 \text{ mm}.$$

The quartz glass tube has a large outer diameter and yet is thick-walled in the sense that its wall thickness is greater than 20 mm. It has an outer lateral surface produced without the influence of a molding tool, i.e. fire-polished, as a result of a molding process in the melt flow, which is smooth and free of streaks. It can be manufactured according to the method of one embodiment and is in one embodiment manufactured using this method. In one embodiment, the tube is made of synthetically produced quartz glass.

Advantageously, for the tube outer diameter $T_a$, the tube inner diameter $T_i$ and the tube wall thickness $(T_a-T_i)/2$ there applies:

$$330 \text{ mm} < T_a < 500 \text{ mm},$$
$$275 \text{ mm} < T_i < 400 \text{ mm},$$
$$25 \text{ mm} < (T_a-T_i)/2) < 50 \text{ mm}.$$

Exemplary Embodiment

FIG. 1 schematically illustrates a device for molding a quartz glass hollow cylinder 2 into a tube 22. The hollow cylinder 2 is made of synthetically produced, undoped quartz glass. It is manufactured by the so-called OVD (Outside Vapor Deposition) method in a soot separation process. In this process, a liquid or gaseous starting substance is subjected to a chemical reaction (hydrolysis or pyrolysis) and deposited from the gaseous phase as solid SiO$_2$ on a rotating mandrel. The starting substance is, for example, silicon tetrachloride (SiCl$_4$) or a chlorine-free silicon compound. As an intermediate product, a porous SiO$_2$ soot body in hollow cylinder shape is obtained, the inner bore of which has been formed by the mandrel removed later. By vitrifying the soot body, the hollow cylinder 2 made of synthetic quartz glass is obtained.

Holder tubes 4, 5 are welded to the end faces of the quartz glass hollow cylinder 2 to be molded. These tubes are clamped in chucks 6 of a horizontal glass lathe 8 and rotate synchronously around the rotational axis 10. The holder tube 4 at the front in the feed direction 32 is closed by using a plug 34. A compressed gas can be introduced into the other holder tube 5.

The hollow cylinder 2 is pushed by using the glass lathe 8 continuously and under rotation around its rotational and longitudinal axis 10 at a predetermined feed rate into a resistance furnace 12, which surrounds the hollow cylinder 2 in an annular manner and which is heated therein zone by zone to a temperature of around 2100° C. The resistance furnace is connected to a computer 24 via a regulatable power source 26.

A pressurized gas can be introduced into the inner bore 16 of the hollow cylinder 2 and tube 22 through a gas inlet 14, and a defined gas pressure can be set. The gas inlet 14 is connected to an adjustable valve 18 is connected to a compressed gas container 20 and to the computer 24.

Driven by the centrifugal force and the gas pressure, the low-viscosity mass of the quartz glass hollow cylinder 2 is inflated to the nominal diameter of the quartz glass tube 22. For measuring the adjusting outer diameter and for an outer diameter regulation, a measuring and regulation device is provided, which includes a high-resolution CCD camera 30 directed at the tube strand 22. The measurement data acquired by the camera 30 is continuously transmitted to the computer 24, on which an image data processing program is installed, by using which the current outer diameter of the tube strand 22 is determined. This is fed into the regulation as the actual value of the regulated variable (tube strand outer diameter), whose actuating variable is the gas pressure. Gas lines are schematically marked by double lines, power lines by single lines, and data lines by dashed lines.

In the following, examples of the molding process are explained with reference to FIG. 1.

Comparative Example 1

| | |
|---|---|
| $C_a$ | 220 mm |
| $C_i$ | 43 mm |
| Feed $V_C$ | 7.5 mm/min |
| Withdrawal $V_T$ | 7.4 mm/min |
| Molding tool | none |
| Throughput | 36 kg/h |
| Target $T_a$ | 363 mm |
| Target $T_i$ | 290 mm |
| Target wall thickness | 36.5 mm |
| Heating power | approx. 740 kW |
| Rotational speed | 10 rpm |
| Glass surface $A_c$ | 365 cm² |
| Glass surface $A_T$ | 374 cm² |

In this comparative example, the initial hollow cylinder 2 has been moved into the heating furnace 12 while rotating about its longitudinal axis 10, and the length portion of the initial hollow cylinder 2 has been uniformly heated in the heating furnace 12. Then the gas pressure was set to the value calculated to achieve the specified tube strand outer diameter using equation (2) (nominal gas pressure). The nominal gas pressure in this case is 5.3 mbar. At the same time, the feed rate was switched to 7.5 mm/min and the free end of the tube strand was withdrawn at the specified withdrawal rate of 7.4 mm/min.

After a while, this caused the tube strand outer diameter to increase too rapidly, so that the gas pressure had to be lowered to 1 mbar to prevent the glass from coming into contact with the heating tube of the resistance furnace 12. After some time, this led to a rapid reduction in the outer diameter of the tube strand, so that the pressure had to be increased again to 4 mbar. However, a stable condition was not achieved and the target geometry could not be achieved by the end of the molding process.

Figure 2:
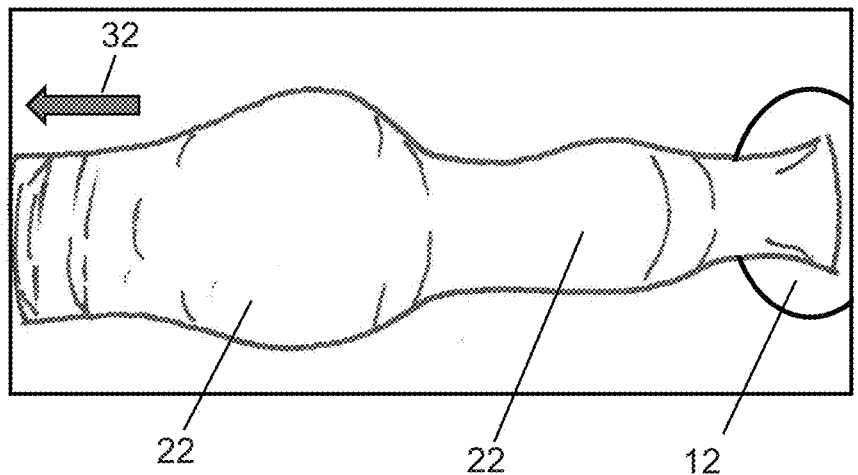
FIG. 2 illustrates a depiction of a quartz glass tube portion exiting a heating furnace during a pressure adjustment phase of a molding process according to a first comparative example.

FIG. 2 illustrates a depiction of the tube strand 22 exiting the heating furnace 12. The irregularity of the outer diameter can be seen immediately.

Figure 3:
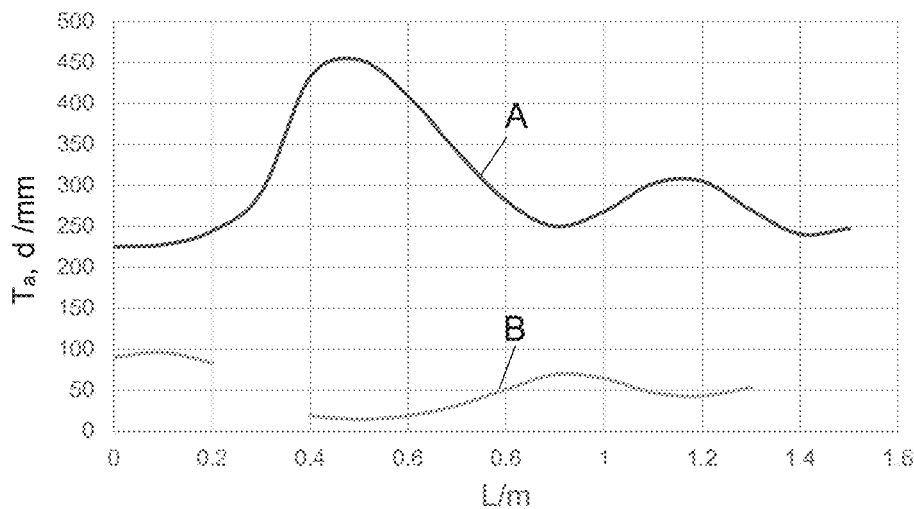
FIG. 3 illustrates a diagram with profiles of outer diameter and wall thickness of the formed quartz glass tube portion of FIG. 2.

The diagram in FIG. 3 illustrates the corresponding curves of outer diameter and wall thickness. The diameter $T_a$ and the wall thickness d are plotted in millimeters on the y-axis and the length L of the withdrawn tube strand in meters on the x-axis. Curve A represents the course of the outer diameter and curve B that of the wall thickness (which could not be measured continuously due to the strong diameter fluctuations).

Figure 4:
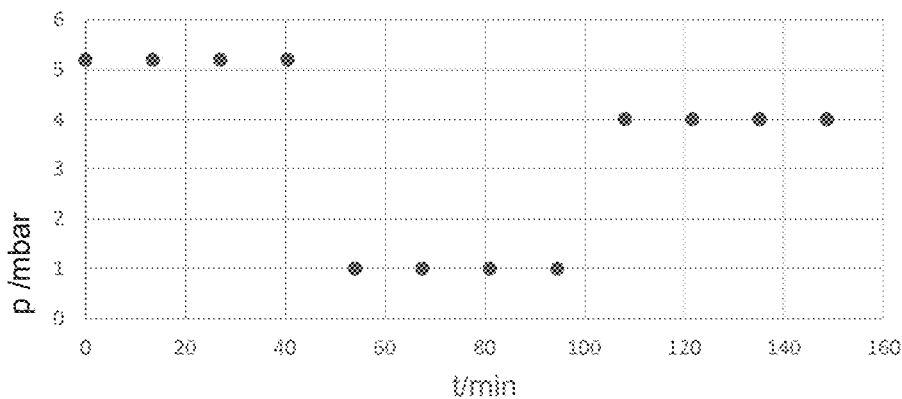
FIG. 4 illustrates a diagram of the gas pressure over time during the start-up phase of the molding process and afterwards in the first comparative example.

The diagram of FIG. 4 illustrates the time curve of the gas pressure described above. The pressure p in mbar is plotted on the y-axis and the time t in minutes on the x-axis.

Comparative Example 2

| | |
|---|---|
| $C_a$ | 220 mm |
| $C_i$ | 43 mm |
| Feed $V_C$ | 7.5 mm/min |
| Withdrawal $V_T$ | 7.4 mm/min |
| Molding tool | contact at 363 mm outer diameter |
| Throughput | 36 kg/h |
| Target $T_a$ | 363 mm |
| Target $T_i$ | 290 mm |
| Target wall thickness | 36.5 mm |
| Performance | approx. 740 kW |
| Rotational speed | 10 rpm |
| Glass surface $A_c$ | 365 cm² |
| Glass surface $A_T$ | 374 cm² |

In this comparative example, a molding tool has been installed in the heating furnace 12 to specify the outer diameter of the withdrawn tube strand 22. The initial hollow cylinder 2 was inserted into the heating furnace 12 while rotating about its longitudinal axis 10, and the length portion of the initial hollow cylinder 2 was uniformly heated in the heating furnace 12. The feed rate was switched on to 7.5 mm/min and the free end of the tube strand was withdrawn at the specified withdrawal rate of 7.4 mm/min. The gas pressure was initially set to a fixed 4 mbar. Attempts were made to mold against the molding tool, which were set to an outer diameter of 363 mm. However, on first contact with the molding tool, the quartz glass began to twist. The pressure was then lowered to 2 mbar and then ramped back up with a flat ramp of 1 mbar/h (approximately 0.017 mbar/min). Despite several attempts to stabilize the molding process, the specified target dimension was not achieved and the molding tool ultimately had to be opened to free the quartz glass mass.

Figure 5:
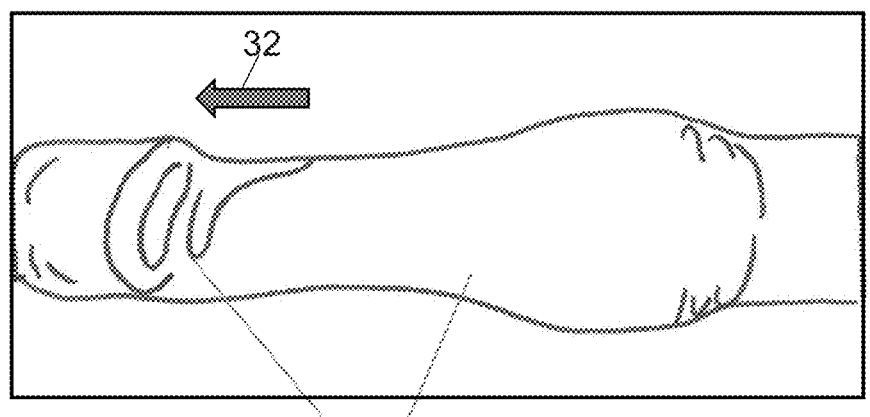
FIG. 5 illustrates a depiction of a quartz glass tube portion exiting a heating furnace during a molding process according to a second comparative example.

The depiction of FIG. 5 illustrates the twists and irregularities in the outer diameter of the tube strand withdrawn to that point.

Example 1

| | |
|---|---|
| $C_a$ | 220 mm |
| $C_i$ | 43 mm |
| Feed $V_C$ | 7.5 mm/min |
| Withdrawal $V_T$ | 7.4 mm/min |
| Molding tool | none |
| Throughput | 36 kg/h |
| Target $T_a$ | 363 mm |
| Target $T_i$ | 290 mm |
| Target wall thickness | 36.5 mm |
| Performance | approx. 740 kW |

-continued

| | |
|---|---|
| Rotational speed | 10 rpm |
| Glass surface $A_c$ | 365 cm² |
| Glass surface $A_T$ | 374 cm² |

In Example 1, the initial hollow cylinder 2 was inserted into the heating furnace 12 while rotating about its longitudinal axis 10, and the initial gas pressure was set to 1 mbar and kept constant during heating. After the length portion of the initial hollow cylinder 2 was uniformly heated in the heating furnace 12, the feed rate was turned on to 7.5 mm/min and the free end of the tube strand was withdrawn at the specified withdrawal rate of 7.4 mm/min. At the same time, the initial value of the gas pressure was increased with a controlled ramp of 0.06 mbar/min until the gas pressure reached its final value of 5.3 mbar. At the same time, this final value corresponds exactly to the nominal gas pressure calculated using equation (2). The pressure build-up phase was thus completed and the tube strand 22 assumed the desired outer diameter of 363 mm. Until then—in the pressure build-up phase—the actual diameter regulation via computer 24 had not been activated. The regulation for the outer diameter was then switched on to keep the geometry within the desired range. The gas pressure served as the actuating variable for the regulation. By inflating the original smaller volume of the hollow cylinder inner bore to the larger volume of the tube inner bore, a continuous gas supply is required to maintain the gas pressure leading to the tube outer diameter target $T_a$.

Figure 6:
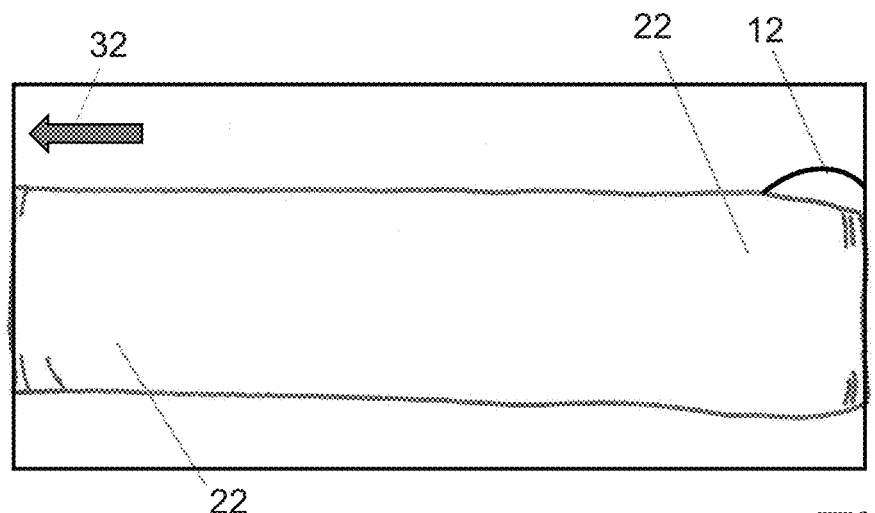
FIG. 6 illustrates a depiction of a quartz glass tube portion exiting a heating furnace during a molding process according to a first exemplary embodiment.

FIG. 6 illustrates a depiction of the tube strand 22 exiting the heating furnace. It has an essentially constant outer diameter and a smooth wall with a fire-polished and therefore defect-free surface produced as a result of the described molding process.

Figure 7:
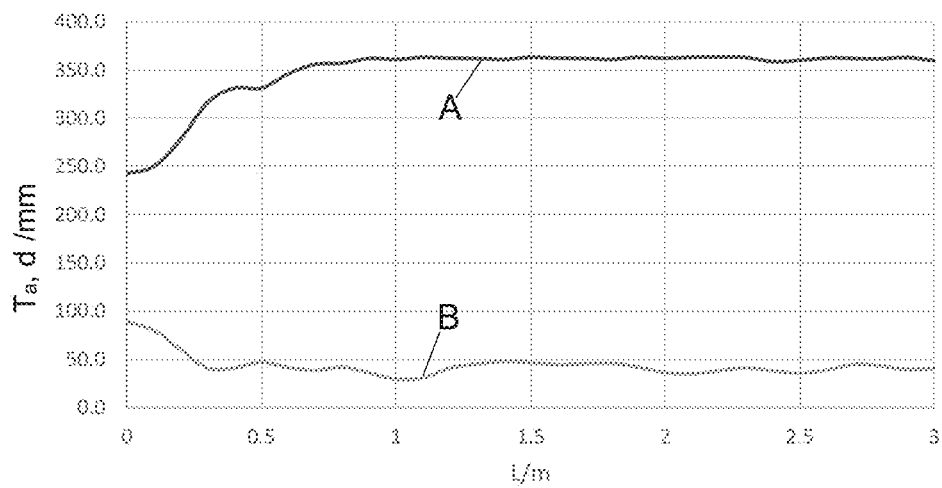
FIG. 7 illustrates a diagram with profiles of outer diameter and wall thickness of the formed quartz glass tube portion of FIG. 6.

The diagram in FIG. 7 illustrates the corresponding curves of outer diameter and wall thickness. The diameter $T_a$ and the wall thickness d are plotted in millimeters on the y-axis and the length L of the withdrawn tube strand in meters on the x-axis. Curve A represents the course of the outer diameter and curve B that of the wall thickness.

Figure 8:
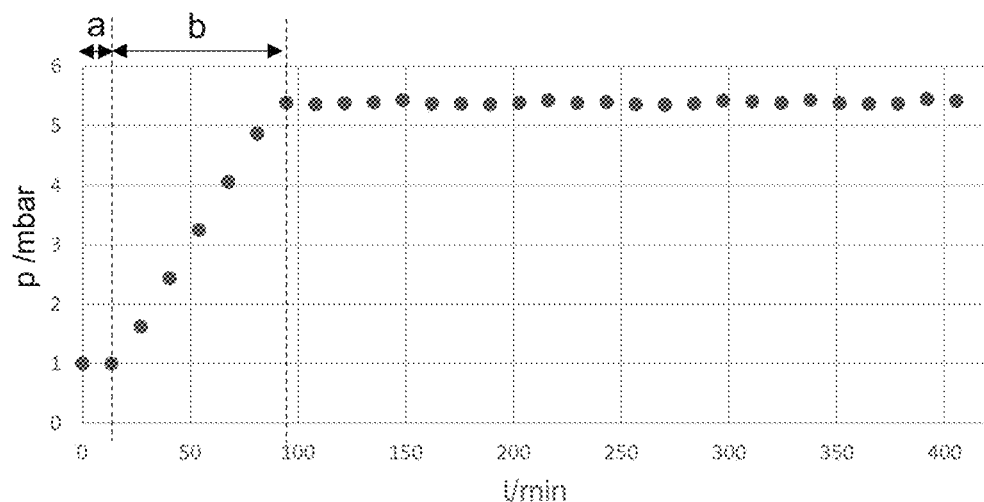
FIG. 8 illustrates a diagram of the gas pressure over time during the start-up phase of the molding process and afterwards in the first exemplary embodiment.

The diagram of FIG. 8 illustrates the time curve of the gas pressure described above. On the y-axis, the pressure p in mbar is plotted against the time t in minutes. The pressure build-up phase is defined by the time period a with the initial constant pressure start value of 1 mbar and the subsequent time period b with a slow increase of the gas pressure up to the final value of 5.3 mbar. During the pressure build-up phase, the diameter regulation is inactive.

From the withdrawn tube strand 22, thick-walled tubes of synthetic quartz glass with a large mean outer diameter around 363 mm, a large mean inner diameter of 290 mm and at the same time with a large mean wall thickness around 36.5 mm were cut to length. These are characterized by smooth and largely defect-free outer and inner lateral surfaces produced as a result of the molding process in the melt flow.

Reference Example

| | |
|---|---|
| $C_a$ | 220 mm |
| $C_i$ | 45 mm |
| Feed $V_C$ | 12 mm/min |
| Withdrawal $V_T$ | 66 mm/min |
| Molding tool | set to 343 mm |

-continued

| | |
|---|---|
| Throughput | 60 kg/h |
| Target $T_a$ | 343 mm |
| Target $T_i$ | 330 mm |
| Target wall thickness | 6.5 mm |
| Performance | approx. 800 kW |
| Rotational speed | 20 rpm |
| Glass surface $A_c$ | 364 cm² |
| Glass surface $A_T$ | 69 cm² |

The reference example corresponds to the state of the art. The hollow cylinder used as the starting cylinder consists of undoped quartz glass, which has been melted from naturally occurring quartz raw materials using the Verneuil method. In this process, a large and elongated block is created by melting crystalline quartz powder using an oxyhydrogen flame. By using a core drill equipped with diamond abrasive particles, a central bore is created and the inner wall and outer wall are lastly mechanically smoothed.

In this molding process, a molding tool is used and the tube strand is withdrawn (rather than compressed) from the heating zone and the softened quartz glass mass while rotating about its longitudinal axis. After the length portion of the initial hollow cylinder 2 was uniformly heated in the heating furnace 12, the feed rate was turned on to 12 mm/min and the free end of the tube strand was set to the specified withdrawal rate of 66 mm/min. At the same time, the gas pressure of a ramp of 1 mbar/min was increased very quickly while being controlled manually. The glass is blown by the gas pressure against the mold jaws, which are set to an outer diameter of 343 mm.

Figure 9:
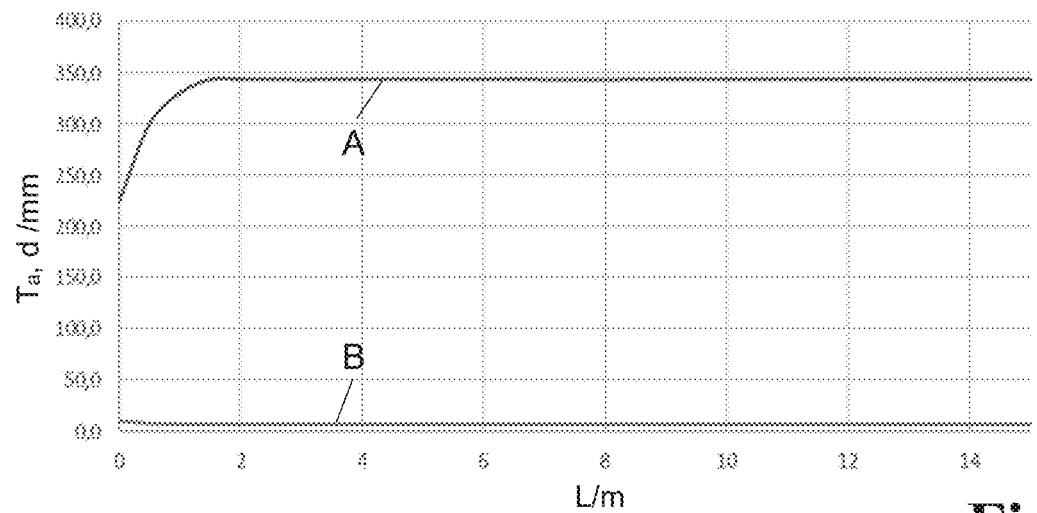
FIG. 9 illustrates a diagram with profiles of outer diameter and wall thickness in the reference example.
Figure 10:
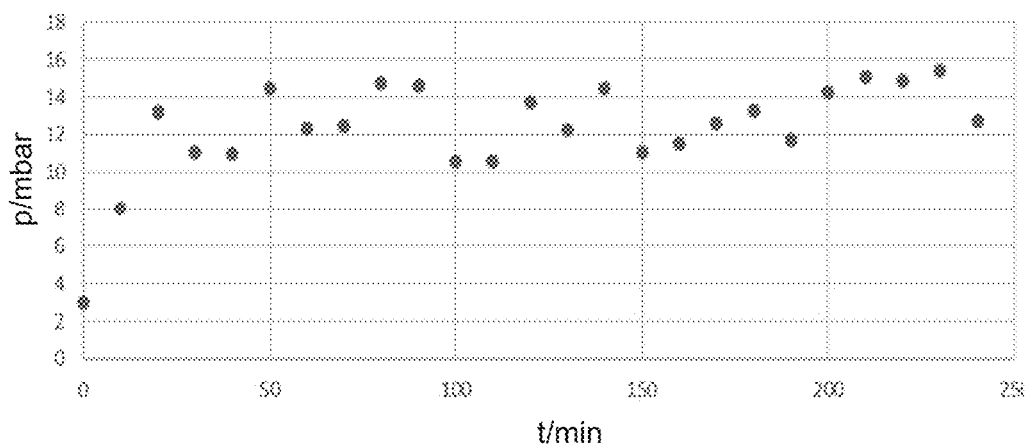
FIG. 10 illustrates a diagram of the gas pressure over time during the molding process in the reference example.

The diagram in FIG. 9 illustrates the variation of the outer diameter and the wall thickness over time (as in FIG. 7). It can be seen that as a result of the use of the molding tool, the outer diameter is very consistent, despite variations in gas pressure, as illustrated in FIG. 10. The fluctuations in gas pressure do not have a significant effect on the outer diameter and wall thickness in this molding process. They are due to the fact that once the nominal outer diameter has been reached, the gas pressure is only very roughly controlled manually in order to keep the outer diameter within the desired range.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A method of manufacturing a tube of quartz glass by molding a hollow cylinder having a hollow cylinder bore, an outer diameter $C_a$, an inner diameter $C_i$ and a wall thickness which is at least 20 mm, by continuously feeding the hollow cylinder under rotation around a rotational axis into a heating zone at a relative feed rate $V_C$, softening the hollow cylinder in areas in the heating zone, and radially expanding the softened area under the effect of a gas pressure applied in the hollow cylinder bore, and continuously molding a tube strand having an outer tube diameter $T_a$, a tube inner diameter $T_i$, and a tube wall thickness from the softened area and withdrawing the tube strand at a withdrawal speed $V_T$,
wherein the gas pressure is an actuating variable of a diameter regulation and/or a diameter control for the tube outer diameter or for a geometrical parameter correlated with the tube outer diameter, and in that in a pressure build-up phase the gas pressure is gradually increased from a lower initial value to a higher final value characterized in that the gas pressure in the pressure build-up phase is increased at least temporarily with a temporal ramp $\Delta p$ for which 0.01 mbar/min$<\Delta p<$0.8 mbar/min, and in that the following applies to the ratio of $V_C$ and $V_T$: $V_T = V_C \pm 0.2 \cdot V_C$.

2. The method according to claim 1, characterized in that the gradual increase of the gas pressure in the pressure build-up phase takes place independently of the diameter regulation or independently of the diameter control.

3. The method according to claim 1, characterized in that a nominal diameter value for the tube outer diameter or for the tube inner diameter is assigned to the diameter regulation or control, and in that a nominal gas pressure is assigned to the nominal diameter value, and in that the lower initial value lies in the range from 10 to 30% of the nominal gas pressure, and the higher final value lies in the range from 90 to 100% of the nominal gas pressure.

4. The method according to claim 3, characterized in that the nominal gas pressure is set in the range from 2 to 20 mbar.

5. The method according to claim 3, characterized in that the nominal gas pressure is set in the range from 4 to 10 mbar.

6. The method according to claim 1, characterized in that the pressure build-up phase has a duration of between 1 and 120 minutes.

7. The method according to claim 1, characterized in that the pressure build-up phase has a duration of between 15 and 60 minutes.

8. The method according to claim 1, characterized in that for the hollow cylinder and for the tube strand there applies:

$$150 \text{ mm} < C_a < 300 \text{ mm},$$
$$30 \text{ mm} < C_i < 180 \text{ mm},$$
$$40 \text{ mm} < (C_a-C_i)/2 < 100 \text{ mm}$$
$$300 \text{ mm} < T_a < 550 \text{ mm},$$
$$250 \text{ mm} < T_i < 450 \text{ mm},$$
$$20 \text{ mm} < (T_a-T_i)/2 < 60 \text{ mm}.$$

9. The method according to claim 1, characterized in that for the hollow cylinder and for the tube strand there applies:

$$4 \cdot C_i < T_i < 8 \cdot C_i,$$
$$C_a + 100 \text{ mm} < T_a < C_a + 300 \text{ mm}.$$

10. The method according to claim 1, characterized in that the tube outer diameter $T_a$ lies in the range of 1.5 times to 2.2 times the hollow cylinder outer diameter $C_a$.

11. The method according to claim 1, characterized in that the initial hollow cylinder has a glass cross-sectional surface $A_C$ and the tube strand has a glass cross-sectional surface $A_T$, wherein:

$$A_T = A_C \pm 0.15 \cdot A_C.$$

12. The method according to claim 11, characterized in that the glass cross-sectional surfaces $A_C$ and $A_T$ lie in the range of 250 to 1000 cm$^2$.

13. The method according to claim 1, characterized in that for the ratio of $V_C$ and $V_T$ there applies:

$$0.8 \cdot V_C \leq V_T \leq 1.05 \cdot V_C.$$

14. The method according to claim 1, characterized in that $V_C$ is adjusted to result in a throughput of quartz glass mass of at least 30 kg/h but less than 45 kg/h.

15. The method according to claim 1, characterized in that the gas pressure is increased during the entire pressure build-up phase with an average temporal ramp $\Delta p_m$ for which there applies:

0.01 mbar/min$<\Delta p_m<$0.5 mbar/min.

16. The method according to claim 1, characterized in that the gas pressure in the pressure build-up phase is increased at least temporarily with the temporal ramp $\Delta p$ for which there applies: 0.01 mbar/min$<\Delta p<$0.5 mbar/min.

17. The method according to claim 1, characterized in that the gas pressure in the pressure build-up phase is increased at least temporarily with the temporal ramp $\Delta p$ for which there applies: 0.01 mbar/min$<\Delta p<$0.2 mbar/min.

18. The method according to claim 1, characterized in that the gas pressure is increased during the entire pressure build-up phase with an average temporal ramp $\Delta p_m$ for which there applies: 0.01 mbar/min$<\Delta p_m<$0.1 mbar/min.

19. The method according to claim 1, characterized in that the gas pressure is increased during the entire pressure build-up phase with an average temporal ramp $\Delta p_m$ for which there applies: 0.01 mbar/min$<\Delta p_m<$0.06 mbar/min.

* * * * *